United States Patent [19]
Broxholm

[11] 3,736,687
[45] June 5, 1973

[54] LOCK FOR A RECIPROCATING MECHANISM

[75] Inventor: Thomas M. Broxholm, Palo Alto, Calif.

[73] Assignee: Pulsepower Systems Inc., San Carlos, Calif.

[22] Filed: Oct. 15, 1970

[21] Appl. No.: 80,846

[52] U.S. Cl. ..........................42/16, 89/189, 89/190
[51] Int. Cl. .........F41c 11/06, F41d 3/00, F41d 3/02
[58] Field of Search ...................42/16; 89/190, 176, 89/189, 175

[56] References Cited
UNITED STATES PATENTS

| | | |
|---|---|---|
| 2,900,878 | 8/1959 | Nomar ................................89/189 |
| 2,715,356 | 8/1955 | Fiorini..................................89/190 |
| 2,093,707 | 9/1937 | Browning ............................89/190 |
| 2,098,727 | 11/1937 | Lahti....................................89/190 |

Primary Examiner—Benjamin A. Borchelt
Assistant Examiner—C. T. Jordan
Attorney—Fryer, Tjensvold, Feix, Phillips & Lempio

[57] ABSTRACT

A linkage reciprocates in a groove and has offset pivotal connections which cause an end of one of the links to engage a notch in the groove at the forward end of travel of the linkage. The engaging surfaces of the link and the notch are curved to produce a quick release from the lock by the rearward movement of the linkage.

6 Claims, 4 Drawing Figures

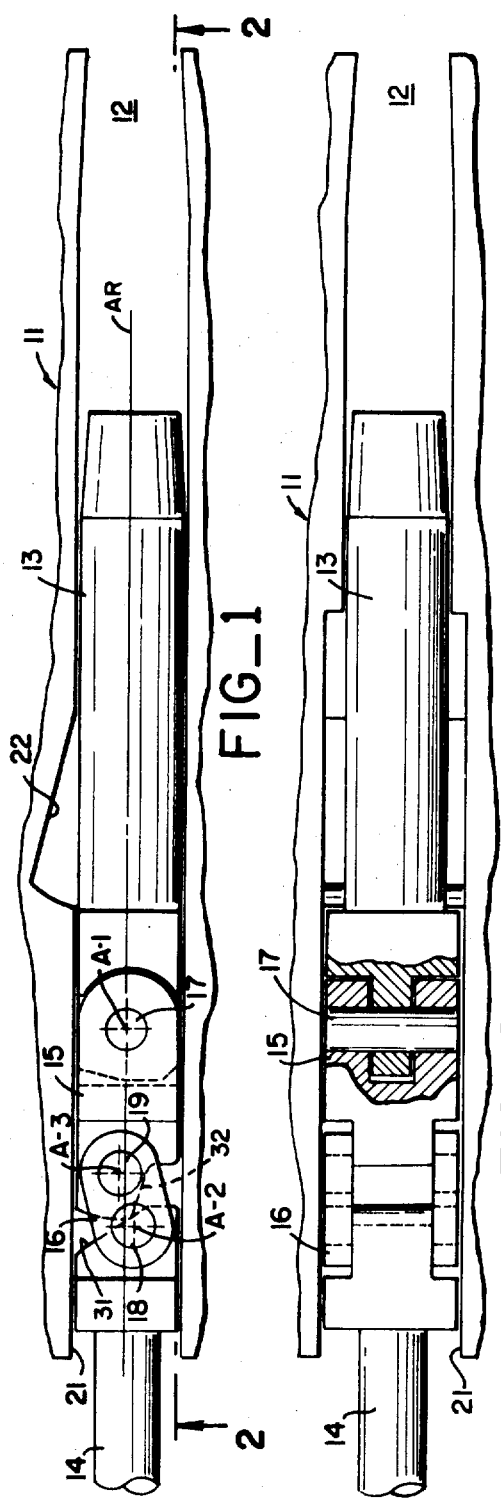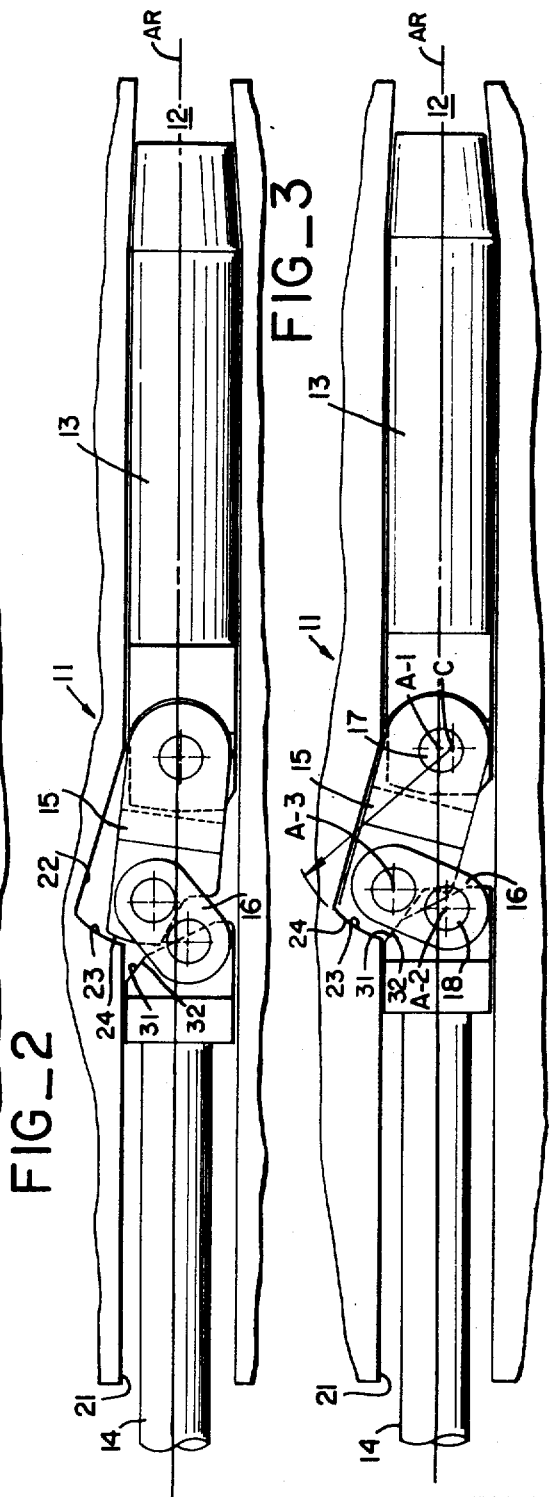
PATENTED JUN 5 1973  3,736,687
INVENTOR.
THOMAS M. BROXHOLM
ATTORNEYS

LOCK FOR A RECIPROCATING MECHANISM

The present invention relates to a lock for a reciprocating mechanism for holding the mechanism in place against an outside force at the forward end of travel of the mechanism.

The present invention relates specifically to a lock for the bolt of a gun.

The combustion pressure on the face of the bolt of a gun can produce a large force tending to open the bolt. The bolt must be locked securely during firing. The bolt must also be capable of being unlocked and moved to a rearward position after firing to permit a new round to be inserted in the firing chamber. In automatic operation at high firing rates there is a problem of locking the bolt effectively without having to resort to complex or relatively heavy mechanisms. Weight is a significant factor when the gun is to be used in aircraft.

It is a primary object of the present invention to construct a bolt locking mechanism that will lock the bolt effectively with a minimum number of parts and weight.

In the present invention two links are connected between the bolt and a ram which drives the bolt mechanism. The link connected to the ram has pivotal connections which are offset from the axis of reciprocation. The links are guided within a groove. The groove has a notch located at the forward end of reciprocation of the linkage. As the linkage approaches the notch, the offset pivotal connections cause the rear end of the link connected to the bolt to move out of the groove and into the notch.

The notch and the end of the link which engages the notch have curved surfaces. The curved surfaces have centers of curvature which are coincident and displaced from the center of rotation of the link connected to the bolt to produce only line contact between the surfaces until the end of the link is fully into the notch. This feature insures that friction between the locking surfaces does not adversely affect the locking or unlocking function.

Unlocking is accomplished by the rearward motion of the ram. This rearward motion transmits a force component by way of the offset pivotal connections to pull the end of the link out of the notch and back into the groove as the bolt is moved back to the open position.

A linkage mechanism constructed as described above and effective to operate in the manner described constitutes a further specific object of the present invention.

Other and further objects of the present invention will be apparent from the following description and claims and are illustrated in the accompanying drawings which, by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

In the drawings:

FIG. 1 is a top plan view of a reciprocating mechanism constructed in accordance with one embodiment of the present invention;

FIG. 2 is a front elevation view taken along the line 2—2 and in the direction indicated by the arrows in FIG. 1;

FIG. 3 is a view like FIG. 1 but showing the mechanism as it starts to move toward the locked position;

FIG. 4 is a view like FIGS. 1 and 3 but showing the mechanism in the fully locked position.

In FIG. 1 a bolt lock mechanism constructed in accordance with one embodiment of the present invention is indicated generally by the reference numeral 11.

While the lock is illustrated and will be described with reference to a specific bolt locking mechanism for a gun, it will be apparent that the linkage and locking arrangement can be used with other reciprocating mechanisms.

In the bolt lock mechanism 11 shown in the drawings, a firing chamber 12 is located at the forward end of a bolt 13 when the bolt 13 is at the forward end of its travel as illustrated in FIGS. 3 and 4.

The bolt 13 is shifted back and forth between the firing position shown in FIG. 4 and the loading position shown in FIG. 1 by a ram 14.

The bolt 13 and the ram 14 are connected by a linkage which includes a link 15 (which serves as a lock in a manner to be described in greater detail below) and a connecting link 16.

The forward end of the link 15 is pivotally connected to the bolt 13 by a pivot pin 17.

The rear end of the link 16 is pivotally connected to the ram 14 by a pivot pin 18 in the form of a stud.

The forward end of the link 16 is pivotally connected to the rear end of the link 15 by pivot pin or stud 19.

There are thus three pivot axes.

The axis A-1 of the pivot pin 17 lies on the axis of reciprocation AR of the bolt 13 and the ram 14.

The axis A-2 of the pivot pin 18 is offset to one side of the axis of reciprocation AR.

The axis A-3 of the pivot pin 19 is offset to the other side of the axis of reciprocation AR.

The bolt links and ram ride in a groove 21 in the gun structure.

The groove 21 is stationary and includes an offset or notch 22 at its forward end.

The side walls of the groove 21 maintain the axis A-1, A-2, and A-3 in the alignment shown in FIG. 1 until the forward motion of the ram 14 pushes the link 15 far enough forward to a position in which the rear end of the link 15 can move into the notch 22. As the rear end of the link or lock 15 reaches the position shown in FIG. 3 the force component produced by the offset of the pivot axes A-2 and A-3 causes the rear end of the lock or link 15 to swing up into the notch 22 about the pivot axis A-1. The continued forward motion of the ram causes the lock to be pushed fully into the notch while at the same time causing the bolt to move a final distance forward to the fully closed position. The position of the lock or link 15 in the notch (as shown in FIG. 4) now locks the bolt against the force developed on its face during firing.

It is an important feature of the present invention that the abutting locking surfaces of the notch and the link 15 have curved surfaces and that the centers of the curvature for the curved surfaces are coincident in the locked position shown in FIG. 4.

As shown in FIG. 4, the centers of curvature for the surface 23 of the notch and the surface 24 of the link 15 are coincident at the point indicated by the reference character C in FIG. 4. The centers of curvature are displaced from the center of rotation (the axis A-1) of the link 15 as illustrated in FIG. 4. Because of this difference in the location of the centers of curvature and centers of rotation, there can only be line contact between the surface 24 and the surface 23 when the link or lock 15 is not fully into the notch. This feature insures that friction between the locking surfaces does not adversely affect the locking or the unlocking function.

When the link 15 is fully in the notch, as illustrated in FIG. 4, the fact that the centers of curvature of the surfaces 23 and 24 are coincident at point C produces a surface contact which is fully effective to prevent any rearward or opening movement of the bolt 13 by the pressures produced by firing in the chamber 12.

In the locked position, as illustrated in FIG. 4, an inclined surface 31 on the ram or driving element 14 engages a mating surface 32 on the underside of the link 15. This insures that any component of force from the combustion in the firing chamber which is not taken up by the back face 23 of the lock goes directly against the ram 14 and does not go through the link 16.

Unlocking is accomplished by rearward movement of the ram 14. A force component is transmitted by way of the link to rotate the link or lock about the forward pivot pin 17 and to start to move the rear end of the link 15 out of the notch. At the same time an axial force component is exerted which tends to start the bolt to move to the rear or opened position. Continued rearward movement of the ram causes the lock to be rotated completely out of the notch and then to continue moving in the groove 21 pulling the bolt to the full opened position.

While I have illustrated and described the preferred embodiments of my invention, it is to be understood that these are capable of variation and modification, and I therefore do not wish to be limited to the precise details set forth, but desire to avail myself of such changes and alterations as fall within the purview of the following claims.

I claim:

1. A lock for a reciprocating mechanism and comprising, a driving element and a driven element aligned for reciprocation forwardly and rearwardly along a common axis of reciprocation, linkage means connecting the driving and driven elements and located between the elements along the axis of reciprocation, locking means in the linkage means effective to lock the driven element at the forward end of its travel against rearward movement from forces acting on the forward end of the driven element, the locking means comprising first and second links and first, second and third pivotal connections respectively pivotally connecting the rear end of the first link to the driving element, the forward end of the first link to the rear end of the second link, and the forward end of the second link to the driven element, guide means coacting with the links for maintaining a controlled orientation of the pivotal connections during reciprocatory motion of the linkage, said guide means including an offset portion having a lock surface shaped to engage a corresponding lock surface of the second link element at the forward end of the travel of the reciprocatory mechanism, and wherein the axes of the first and second pivotal connections are offset on opposite sides of said axis of reciprocation and with respect to the offset of the guide means to cause the rear end of the second link to move to a position in which the lock surface of the second link is in locking abuttment with the lock surface of the guide means at the forward end of travel of the driven element, whereby compression on the linkage by the driving element at the end of the forward stroke of the driving element collapses the linkage to lock the second link in the offset, and tension on the linkage by the driving element at the beginning of the rearward stroke straightens the linkage to unlock the second link from the offset in the guide means.

2. A lock as defined in claim 1 wherein the reciprocating mechanism is the bolt mechanism of a gun, the driven element is the bolt of the gun, and the lock is effective to prevent rearward movement of the bolt as a result of combustion pressure developed on the face of the bolt during firing.

3. A lock as defined in claim 1 wherein the second link includes a surface which engages a surface of the driving element in the locked position to prevent movement of the second link out of the offset in the guide means until the driving element starts rearward movement.

4. A lock for a reciprocating mechanism of the kind in which a driving element shifts a driven element forward and rearward along a common axis of reciprocation and comprising, linkage means between the driving and driven elements, locking means in the linkage means effective to lock the driven element at the forward end of its travel against rearward movement from forces acting on the forward end of the driven element, the locking means comprising first and second links and first, second and third pivotal connections respectively pivotally connecting the rear end of the first link to the driving element, the forward end of the first link to the rear end of the second link, and the forward end of the second link to the driven element, guide means coacting with the links for maintaining a controlled orientation of the pivotal connections during reciprocatory motion of the linkage, said guide means including an offset portion having a lock surface shaped to engage a corresponding lock surface of the second link element at the forward end of the travel of the reciprocatory mechanism, and wherein the axes of the first and second pivotal connections are offset on opposite sides of said axis of reciprocation and with respect to the offset of the guide means to cause the rear end of the second link to move to a position in which the lock surface of the second link is in locking abutment with the lock surface of the guide means at the forward end of travel of the driven element, and wherein the lock surfaces of the second link and the guide means are curved surfaces and the centers of curvature for said curved surface are coincident in the locked position.

5. A lock as defined in claim 4 wherein the centers of curvature of the curved surfaces are offset from the pivotal axis of the forward end of the second link in said locked position.

6. A lock as defined in claim 4 wherein the axis of the third pivotal connection is on said axis of reciprocation and the centers of curvature for the lock surfaces of the guide means and the second link are coincident and laterally displaced from the axis of the third pivotal connection to cause only line contact between the lock surface of the guide means and the lock surface of the second link when the second link is being swung into and out of the lock and to cause surface contact between said surfaces when the link is fully in the lock.

* * * * *